United States Patent
Shen et al.

(10) Patent No.: US 11,632,036 B2
(45) Date of Patent: Apr. 18, 2023

(54) POWER CONTROLLER WITH SHORT-CIRCUITED PROTECTION AND METHOD OF CONTROLLING THE SAME

(71) Applicant: POWER DESIGN CORPORATION LIMITED, Central (HK)

(72) Inventors: Yi-Lun Shen, Central (HK); Yu-Yun Huang, Central (HK)

(73) Assignee: ARK SEMICONDUCTOR CORP. LTD., Shenzhen (CN)

( * ) Notice: Subject to any disclaimer, the term of this patent is extended or adjusted under 35 U.S.C. 154(b) by 159 days.

(21) Appl. No.: 17/372,089

(22) Filed: Jul. 9, 2021

(65) Prior Publication Data

US 2022/0045600 A1 Feb. 10, 2022

(30) Foreign Application Priority Data

Aug. 10, 2020 (TW) .................................. 109127106

(51) Int. Cl.
  *H02M 1/32* (2007.01)
  *H02M 3/335* (2006.01)
(52) U.S. Cl.
  CPC ......... *H02M 1/32* (2013.01); *H02M 3/33576* (2013.01)
(58) Field of Classification Search
  CPC .......................... H02M 1/32; H02M 3/33576
  See application file for complete search history.

(56) References Cited

U.S. PATENT DOCUMENTS

| | | | |
|---|---|---|---|
| 10,193,456 B2 * | 1/2019 | Su ........................... | G05F 1/452 |
| 2010/0320989 A1 | 12/2010 | Chang et al. | |
| 2012/0140370 A1 * | 6/2012 | Chen ........................ | H02H 3/093 |
| | | | 361/87 |
| 2013/0272036 A1 | 10/2013 | Fang | |
| 2014/0146581 A1 * | 5/2014 | Tsou ........................ | H02M 1/32 |
| | | | 327/175 |
| 2015/0062970 A1 * | 3/2015 | Huang ............... | H02M 3/33507 |
| | | | 363/15 |
| 2019/0238048 A1 * | 8/2019 | Chou ........................ | H02M 1/32 |
| 2022/0216796 A1 * | 7/2022 | Xiao ................... | H02M 3/33569 |

FOREIGN PATENT DOCUMENTS

| | | |
|---|---|---|
| CN | 101969188 A | 2/2011 |
| TW | 201322574 A | 6/2013 |
| TW | M457343 U | 7/2013 |
| TW | 201342783 A | 10/2013 |
| TW | 201624893 A | 7/2016 |

* cited by examiner

*Primary Examiner* — Rafael O De Leon Domenech
(74) *Attorney, Agent, or Firm* — Muncy, Geissler, Olds & Lowe, P.C.

(57) ABSTRACT

A power controller with short-circuit protection is disclosed to control a power switch, which is connected in series with a current-sense resistor and an inductive device between two power lines. The current-sense resistor provides a current-sense signal. The power controller includes a PWM signal generator and a short-circuit protection circuit. The PWM signal generator generates a PWM signal to the power switch to create switching cycles, each consisting of an ON time and an OFF time. The short-circuit protection circuit has a high-pass filter and a condition detector. The high-pass filter high-pass filters the current-sense signal to provide a filtered signal to the condition detector, which determines whether the filtered signal fits a predetermined condition during the ON time to generate a short-circuit protection signal and to prevent the power switch being turned on.

17 Claims, 5 Drawing Sheets

POWER CONTROLLER WITH SHORT-CIRCUITED PROTECTION AND METHOD OF CONTROLLING THE SAME

BACKGROUND

Technical Field

The present disclosure relates to a power controller applied to a switching power supply and a method of controlling the same, and more particularly to a power controller with short-circuited protection and a method of controlling the same when a current sense resistor of the switching power supply is short-circuited.

Description of Related Art

The statements in this section merely provide background information related to the present disclosure and do not necessarily constitute prior art.

In addition to requiring accurate output voltage or output current, the power supply must also have some protection mechanisms to prevent abnormal or unexpected error conditions. For example, common protection mechanisms include an output over-voltage protection, an output over-current protection, an over-temperature protection, and a short circuit protection.

What the short circuit protection requires is that when any electronic component in the power supply is short-circuited, the power supply must not pose any risk to the external surrounding. The power supply often has a current sense resistor to sense the current flowing through the power switch in the power supply. When the current sense resistor is short-circuited, if it does not respond in a timely manner, the current will often become very large when flowing through the power switch within one or two switch cycles, and the power supply may explode or catch fire.

FIG. 1 shows a block circuit diagram of a conventional flyback power supply 10. The flyback power supply 10 includes a transformer TF, a power switch 20, a current sense resistor RCS, a compensation capacitor CCOMP, a power controller 100, a diode DS and an output capacitor COUT. The transformer TF has a primary-side winding PRM and a secondary-side winding SEC. The primary-side PRM, the power switch 20, and the current sense resistor RCS are connected between an input power line IN and an input ground GNDIN in series. The power controller 100 provides a PWM signal $S_{DRV}$ to control the power switch 20 so that an AC voltage and an AC current inductively generate at the secondary-side winding SEC, and an output voltage $V_{OUT}$ is generated at an output end OUT for supplying power to a load 24 after the AC voltage and the AC current are rectified by the diode DS. The current sense resistor RCS provides a current sense signal $V_{CS}$ to feed back to the power controller 100.

FIG. 2A shows waveforms of the PWM signal $S_{DRV}$, the current sense signal $V_{CS}$, and an input current $I_{IN}$ flowing through the primary-side winding PRM under the normality of the current sense resistor RCS. When the current sense signal $V_{CS}$ exceeds an attenuated compensation signal $V_{COMP-AN}$ generated by the power controller 100 according to a compensation signal $V_{COMP}$, the power controller 100 ends a turned-on time $T_{ON}$ to control a peak value of the input current $I_{IN}$. As shown in FIG. 2A, when the current sense resistor RCS is normal, the waveform of the current sense signal $V_{CS}$ is approximately equal to the waveform of the input current $I_{IN}$.

FIG. 2B shows waveforms of the PWM signal $S_{DRV}$, the current sense signal $V_{CS}$, and the input current $I_{IN}$ under the short-circuited abnormality of the current sense resistor RCS. Since the resistance value of the current sense resistor RCS equivalently becomes zero ohm, the current sense signal $V_{CS}$ is constantly zero volt. Since the current sense signal $V_{CS}$ has not exceeded the attenuated compensation signal $V_{COMP-AN}$, the power controller 100 makes the turned-on time $T_{ON}$ be the maximum turned-on time. As a result, the turned-off time $T_{OFF}$ is too short, and the input current $T_{OFF}$ is too short to be released in this switch cycle, and it continues to increase from the next switch cycle. Soon, within one or two switch cycles, the transformer TF will be magnetically saturated due to the excessive input current $I_{IN}$, and the power supply may explode or catch fire.

SUMMARY

The present disclosure provides a power controller. The power controller controls a power switch. The power switch, a current sense resistor, and an inductive component are connected between two power lines in series, and the current sense resistor provides a current sense signal. The power controller includes a PWM signal generator and a short-circuited protection circuit. The PWM signal generator generates a PWM signal to the power switch to generate a plurality of switch cycles, and each switch cycle has a turned-on time and a turned-off time. The short-circuited protection circuit receives the current sense signal. The short-circuited protection circuit includes a high-pass filter and a state detection circuit. The high-pass filter filters the current sense signal in a high-pass manner to generate a filtered signal. The state detection circuit detects the filtered signal. When the filtered signal meets a predetermined condition within the turned-on time, the state detection circuit provides a short-circuited protection signal to disable the PWM signal generator to prevent the power switch being turned on.

The present disclosure provides control method. The control method is applied to a power controller to control a power switch. The power switch, a current sense resistor, and an inductive component are connected between two power lines in series. The current sense resistor provides a current sense signal. The control method includes steps of: turning on and turning off the power switch to generate a plurality of switch cycles, each switch cycle having a turned-on time and a turned-off time, filtering the current sense signal in a high-pass manner within the turned-on time to generate a filtered signal, and providing a short-circuited protection signal to prevent the power switch being turned on when the filtered signal meets a predetermined condition within the turned-on time.

The present disclosure provides a power controller. The power controller controls a power switch. The power switch, a current sense resistor, and an inductive component are connected between two power lines in series. The current sense resistor provides a current sense signal. The power controller includes a PWM signal generator and a short-circuited protection circuit. The PWM signal generator generates a PWM signal to the power switch to generate a plurality of switch cycles having a first switch cycle, and the first switch cycle has a turned-on time and a turned-off time. The short-circuited protection circuit receives the current sense signal. The short-circuited protection circuit includes a high-pass filter and a state detection circuit. The high-pass filter filters the current sense signal in a high-pass manner to generate a filtered signal. The state detection circuit detects the filtered signal. When the filtered signal meets a predetermined condition that the current sense resistor is short-circuited within the turned-on time, the state detection circuit provides a short-circuited protection signal to disable the PWM signal generator to prevent the power switch being turned on.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
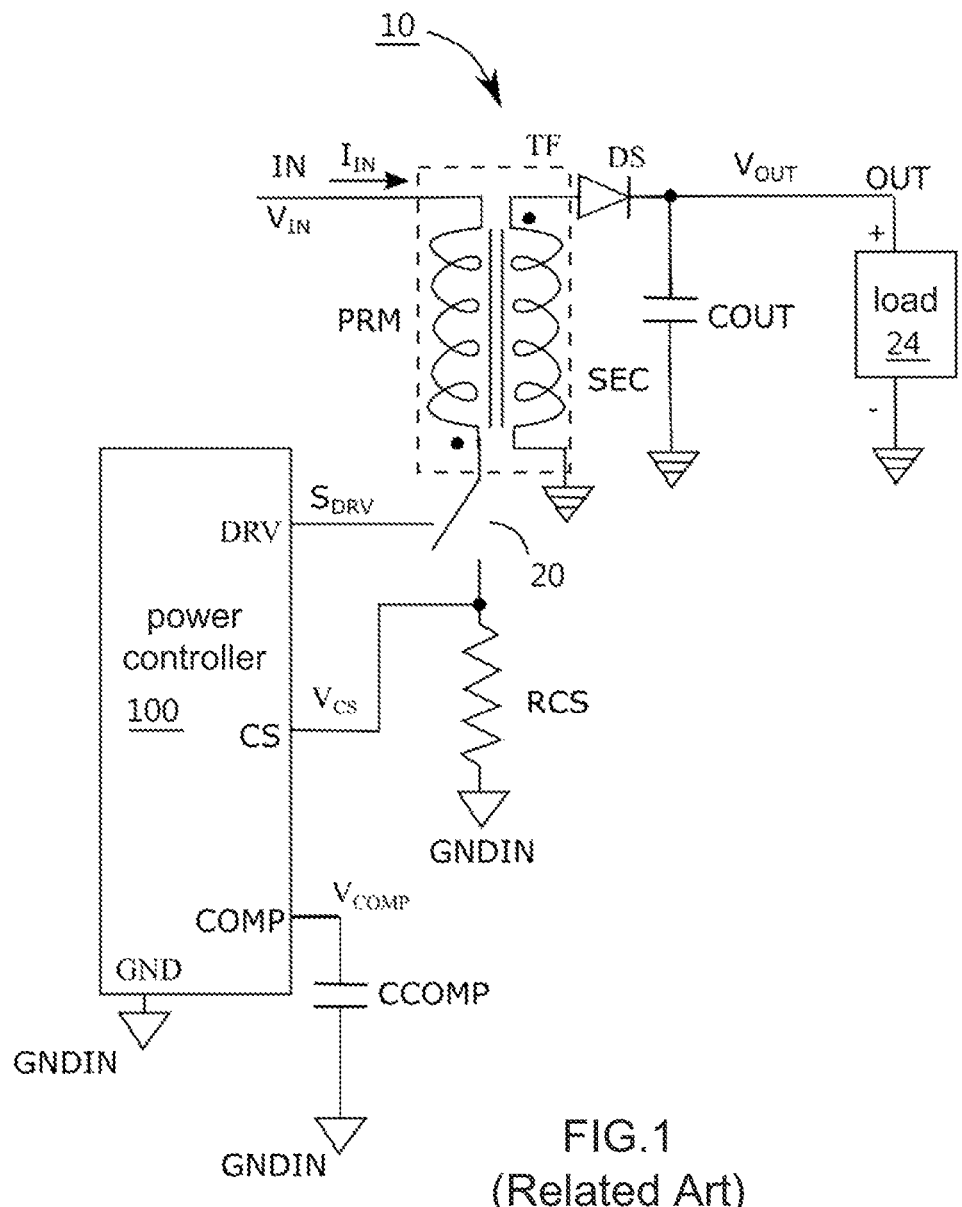
FIG. 1 is a block circuit diagram of a conventional flyback power supply.

Reference will now be made to the drawing figures to describe the present disclosure in detail. It will be understood that the drawing figures and exemplified embodiments of present disclosure are not limited to the details thereof.

In this specification, there are some same symbols, which represent elements with the same or similar structure, function, and principle, and those with general knowledge in the industry can infer it based on the teaching of this specification. For the sake of simplicity of the specification, the elements with the same symbols will not be repeated.

Although the flyback architecture is used as embodiments in the present disclosure, the present disclosure is not limited thereto. In other embodiments, the present disclosure may be applied to other power conversion architectures, such as boost conversion architecture.

Figure 3:
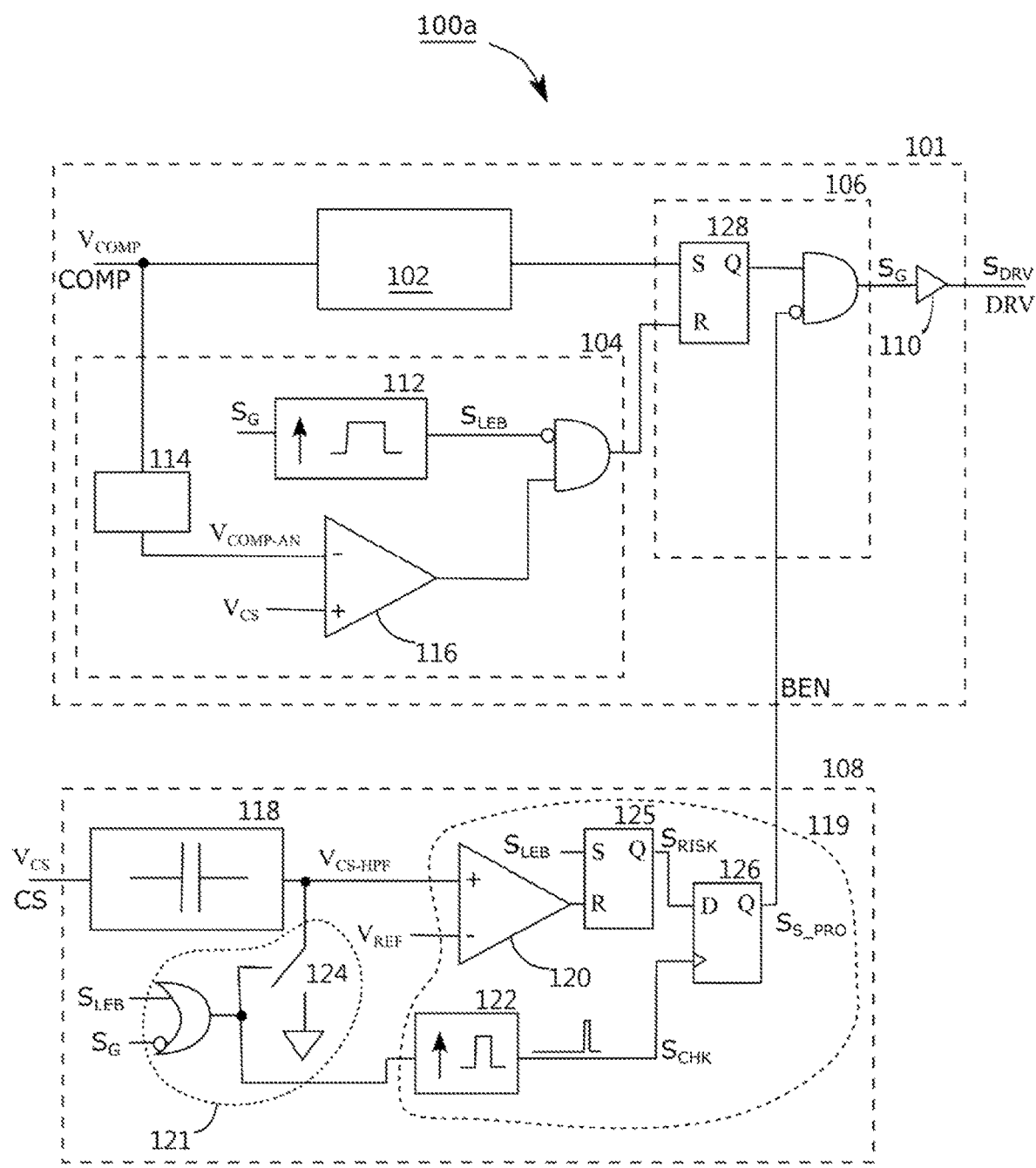
FIG. 3 is a block circuit diagram of a power controller according to the present disclosure.

Please refer to FIG. 3, which shows a power controller 100a according to the present disclosure. In one embodiment, the power controller 100a may replace the power controller 100 shown in FIG. 1 to control the power switch 20. The power controller 100a includes a PWM (pulse-width modulation) signal generator 101 and a short-circuited protection circuit 108.

According to a compensation signal $V_{COMP}$ and a current sense signal $V_{CS}$, the PWM signal generator 101 generates a PWM signal $S_{DRV}$ to the power switch 20 to generate a plurality of switch cycles $T_{CYC}$. Each switch cycle $T_{CYC}$ has a turned-on time $T_{ON}$ and a turned-off time $T_{OFF}$.

The compensation signal $V_{COMP}$ may be generated according to a comparison result between an output voltage $V_{OUT}$ and a predetermined target voltage. For example, an error amplifier is used to compare the output voltage $V_{OUT}$ with the predetermined target voltage to decide charging or discharging a compensation capacitor CCOMP to generate a compensation signal $V_{COMP}$ so as to control the output voltage $V_{OUT}$ approximately at the predetermined target voltage.

A frequency controller 102 decides a length of the switch cycle $T_{CYC}$ according to the compensation signal $V_{COMP}$. After one switch cycle $T_{CYC}$, the frequency controller 102 sets an SR-type flip flop 128 of a logic circuit 106 to make a PWM signal $S_G$ be logic "1". According to the PWM signal $S_G$, a drive circuit 110 correspondingly generates a PWM signal $S_{DRV}$ to (start to) turn on the power switch 20. Therefore, the PWM signal $S_{DRV}$ and the PWM signal $S_G$ are logically equivalent to each other, although their voltage levels may be different. The frequency controller 102 decides the beginning of the turned-on time $T_{ON}$ or the finish of the turned-off time $T_{OFF}$.

A turned-on time controller 104 includes an attenuator 114. According to the compensation signal $V_{COMP}$, the attenuator 114 generates an attenuated compensation signal $V_{COMP-AN}$. The attenuated compensation signal $V_{COMP-AN}$ may be regarded as a scale-down compensation signal $V_{COMP}$. For example, the attenuated compensation signal $V_{COMP-AN}$ is equal to the product of a constant K and the compensation signal $V_{COMP}$, and the constant K is between 0 and 1. The turned-on time controller 104 determines the turned-on time $T_{ON}$ according to the compensation signal $V_{COMP}$ and the current sense signal $V_{CS}$. In the turned-on time $T_{ON}$, if the current sense signal $V_{CS}$ exceeds the attenuated compensation signal $V_{COMP}$-AN, a comparator 116 resets the SR-type flip flop 128 to make the PWM signal $S_G$ and the PWM signal $S_{DRV}$ be logic "0" to end the turned-on time $T_{ON}$ and start the turned-off time $T_{OFF}$.

The turned-on time controller 104 further includes a leading-edge blanking signal generator 112. The leading-edge blanking signal generator 112 is driven by a rising edge of the PWM signal $S_G$ to a leading-edge blanking signal $S_{LEB}$, and a leading-edge blanking time $T_{LEB}$ may be defined at the beginning of the turned-on time $T_{ON}$. As shown in FIG. 3, within the leading-edge blanking time $T_{LEB}$, i.e., the leading-edge blanking signal $S_{LEB}$ with logic "1", the output of the comparator 116 is blocked/blanked, thereby failing to reset the SR-type flip flop 128. Therefore, the leading-edge blanking signal generator 112 makes the length of the turned-on time $T_{ON}$ at least the leading-edge blanking time $T_{LEB}$.

The short-circuited protection circuit 108 includes a high-pass filter 118, a clamp circuit 121, and a state detection circuit 119.

The high-pass filter 118 filters the current sense signal $V_{CS}$ in a high-pass manner to generate a filtered signal $V_{CS-HPF}$. In one embodiment, the high-pass filter 118 includes a capacitor and a resistor, which is connected between a current sense pin CS and an inverting input end of a comparator 120 in series. In another embodiment, the high-pass filter 118 includes a capacitor, which is connected between the current sense pin CS and the inverting input end of the comparator 120 in series, and a resistor, which is connected between the inverting input end of the comparator 120 and an input ground GNDIN.

The clamp circuit 121 includes a switch 124 and some logic gates. Within the leading-edge blanking time $T_{LEB}$ and the turned-off time $T_{OFF}$, the clamp circuit 121 clamps the filtered signal $V_{CS\text{-}HPF}$ to a start value, for example but not limited to zero volt shown in FIG. 3. In other words, the clamp circuit 121 sets the filtered signal $V_{CS\text{-}HPF}$ to the start value within the leading-edge blanking time $T_{LEB}$ and the turned-off time $T_{OFF}$.

The state detection circuit 119 detects the filtered signal $V_{CS\text{-}HPF}$. When the filtered signal $V_{CS\text{-}HPF}$ meets a predetermined condition within the turned-on time $T_{ON}$, the state detection circuit 119 provides a short-circuited protection signal $S_{S\_PRO}$ to disable the PWM signal generator 101 through a disable end BEN to prevent the power switch 20 being turned on. The state detection circuit 119 includes the comparator 120, a SR-type flip flop 125, a D-type flip flop 126, and a pulse generator 122. In one embodiment, the predetermined condition is that the filtered signal $V_{CS\text{-}HPF}$ is not higher than a predetermined voltage $V_{REF}$.

The risk signal $S_{RISK}$ is in the leading-edge blanking time $T_{LEB}$, and is set to the logic "1" by the SR-type flip flop 125. The comparator 120 compares the filtered signal $V_{CS\text{-}HPF}$ with the predetermined voltage $V_{REF}$. The predetermined voltage $V_{REF}$ may be, for example but not limited to, 0.1 volts. When the filtered signal $V_{CS\text{-}HPF}$ is higher (exceeds) the predetermined voltage $V_{REF}$, the risk signal $S_{RISK}$ is reset to logic "0". At a predetermined time point after the leading-edge blanking time $T_{LEB}$, the pulse generator 122 provides a short pulse $S_{CHK}$ to a clock input end of the D-type flip flop 126 to check the risk signal $S_{RISK}$ so as to determine whether to generate the short-circuited protection signal $S_{S\_PRO}$.

Figure 2A:
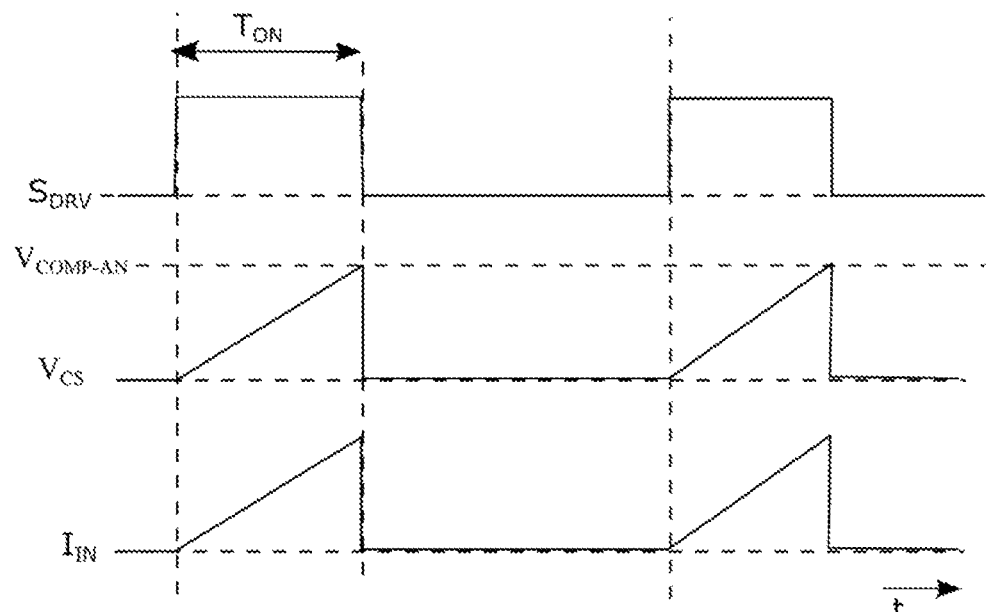
FIG. 2A shows waveforms of a PWM signal, a current sense signal, and an input current flowing through a primary-side winding under the normality of a current sense resistor.
Figure 2B:
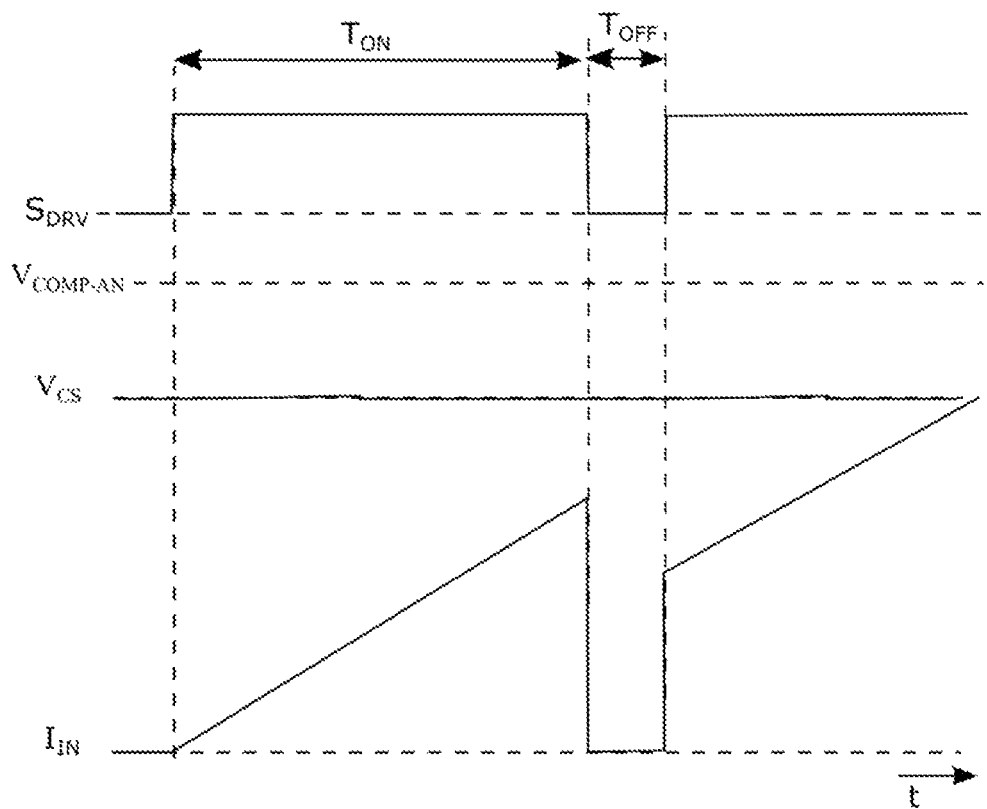
FIG. 2B shows waveforms of the PWM signal, the current sense signal, and the input current under the short-circuited abnormality of the current sense resistor.
Figure 4A:
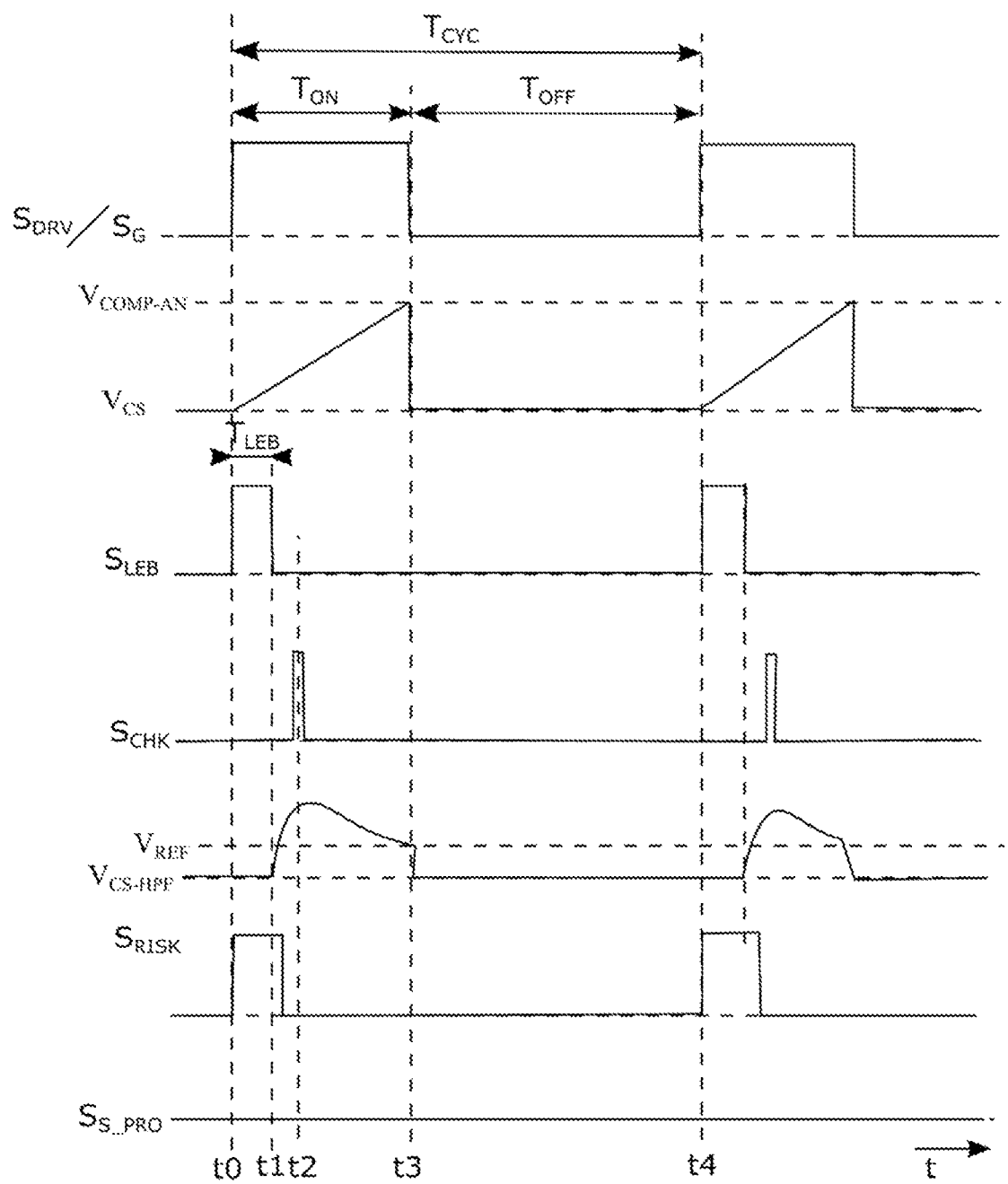
FIG. 4A shows waveforms of a PWM signal, a PWM signal, a current sense signal, a leading-edge blanking signal, a short pulse, a filtered signal, a risk signal, and a short-circuited protection signal under the normality of the current sense resistor.

Please refer to FIG. 4A, which shows waveforms of the PWM signal $S_{DRV}$, the PWM signal $S_G$, the current sense signal $V_{CS}$, the leading-edge blanking signal $S_{LEB}$, the short pulse $S_{CHK}$, the filtered signal $V_{CS\text{-}HPF}$, the risk signal $S_{RISK}$, and the short-circuited protection signal $S_{S\_PRO}$ under the normality of the current sense resistor RCS. Since the FIG. 4A is similar to FIG. 2A, the detail description of the same is omitted here for conciseness.

As shown in FIG. 4A, the leading-edge blanking time $T_{LEB}$ of the leading-edge blanking signal $S_{LEB}$ is defined at the beginning of the turned-on time $T_{ON}$, i.e., the leading-edge blanking signal $S_{LEB}$ with logic "1". In FIG. 4A, the leading-edge blanking time $T_{LEB}$ starts at the time point t0 and ends at the time point t1, i.e., the leading-edge blanking time $T_{LEB}$ is between the time point t0 and the time point t1. Within the leading-edge blanking time $T_{LEB}$ and the turned-off time $T_{OFF}$, the filtered signal $V_{CS\text{-}HPF}$ is clamped to zero volt by the clamp circuit 121. Within the leading-edge blanking time $T_{LEB}$, the risk signal $S_{RISK}$ is predetermined to a first level, i.e., the logic "1".

After the leading-edge blanking time $T_{LEB}$, the filtered signal $V_{CS\text{-}HPF}$ is no longer clamped by the clamp circuit 121. Therefore, the filtered signal $V_{CS\text{-}HPF}$ reflects the dynamic change of the current sense signal $V_{CS}$ and starts to rise from zero volt. When the filtered signal $V_{CS\text{-}HPF}$ is higher (exceeds) the predetermined voltage $V_{REF}$, the risk signal $S_{RISK}$ is transited to a level that is different from the first level, i.e., the logic "0".

At the time point t2 after the leading-edge blanking time $T_{LEB}$, the pulse generator 122 provides the short pulse $S_{CHK}$ to the clock input end of the D-type flip flop 126. At this condition, since the risk signal $S_{RISK}$ is logic "0", the short-circuited protection signal $S_{S\_PRO}$ still keeps the logic "0", and the current sense resistor RCS is regarded as normal. Accordingly, the PWM signal generator 101 may turn on the power switch 20 again at the time point t4 to start a new turned-on time $T_{ON}$.

Figure 4B:
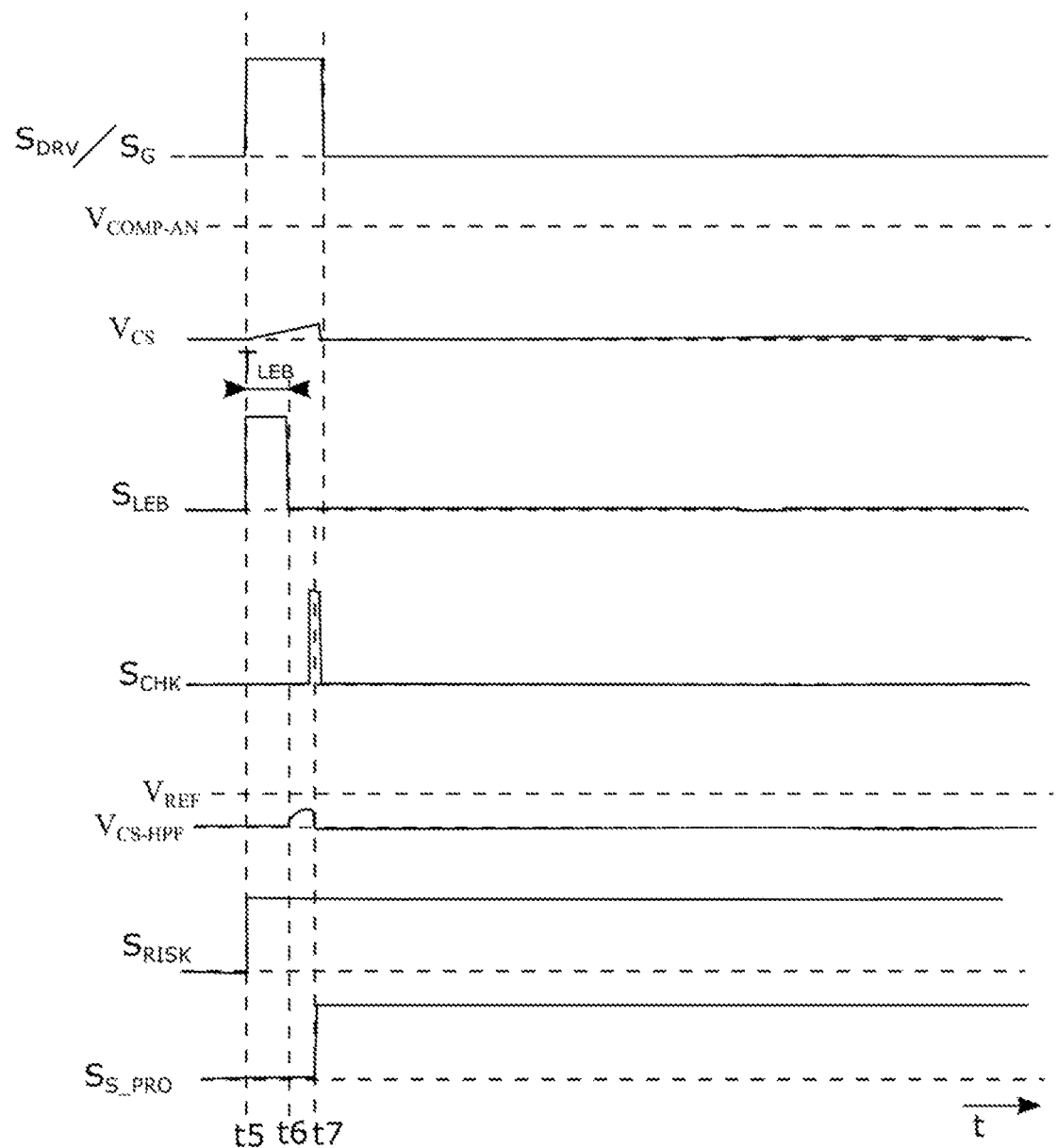
FIG. 4B shows some signal waveforms under the short-circuited abnormality of the current sense resistor.

In comparison with FIG. 4A, FIG. 4B shows some signal waveforms under the short-circuited abnormality of the current sense resistor RCS. In FIG. 4B, since the current sense resistor RCS is short-circuited, the current sense signal $V_{CS}$ is maintained at approximately zero volt.

In FIG. 4B, the leading-edge blanking time $T_{LEB}$ starts at the time point t5 and ends at the time point t6, i.e., the leading-edge blanking time $T_{LEB}$ is between the time point t5 and the time point t6. Within the leading-edge blanking time $T_{LEB}$, the filtered signal $V_{CS\text{-}HPF}$ is clamped to zero volt by the clamp circuit 121, and the risk signal $S_{RISK}$ is predetermined to the logic "1".

After the leading-edge blanking time $T_{LEB}$, although the clamp circuit 121 no longer clamps the filtered signal $V_{CS\text{-}HPF}$, the current sense signal $V_{CS}$ is still approximately zero volt, and there is almost no dynamic change. Therefore, the filtered signal $V_{CS\text{-}HPF}$ is approximately zero volt. Since the filtered signal $V_{CS\text{-}HPF}$ has never exceeded the predetermined voltage $V_{REF}$, the risk signal $S_{RISK}$ still keeps the first level, i.e., the logic "1".

At the time point t7 after the leading-edge blanking time $T_{LEB}$, the pulse generator 122 provides the short pulse $S_{CHK}$ to the clock input end of the D-type flip flop 126. At this condition, since the risk signal $S_{RISK}$ is the first level, i.e., the logic "1", the short-circuited protection signal $S_{S\_PRO}$ is transited to the logic "1", and the power switch 20 is immediately turned off by the logic circuit 106. Since the short-circuited protection signal $S_{S\_PRO}$ keeps the logic "1", the power switch 20 remains turned off to implement the short-circuited protection.

As shown in FIG. 4B, when the current sense resistor RCS is short-circuited, the power controller 100a can quickly detect within the turned-on time $T_{ON}$ to correspondingly turn off the power switch 20 to stop the power conversion and to implement the real-time short-circuited protection.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power controller configured to control a power switch, the power switch, a current sense resistor, and an inductive component connected between two power lines in series, the current sense resistor configured to provide a current sense signal, the power controller comprising:
   a PWM signal generator configured to generate a PWM signal to the power switch to generate a plurality of switch cycles having a first switch cycle, and the first switch cycle having a turned-on time and a turned-off time, and
   a short-circuited protection circuit configured to receive the current sense signal, the short-circuited protection circuit comprising:
   a high-pass filter configured to filter the current sense signal in a high-pass manner to generate a filtered signal, and
   a state detection circuit configured to detect the filtered signal,
   wherein when the filtered signal is less than a predetermined voltage within the turned-on time, the state detection circuit provides a short-circuited protection signal to disable the PWM signal generator to prevent the power switch being turned on.

2. The power controller as claimed in claim 1, wherein the short-circuited protection circuit further comprises:
a clamp circuit configured to set the filtered signal to a starting value at the beginning of the turned-on time.

3. The power controller as claimed in claim 2, wherein the PWM signal generator comprises:
a leading-edge blanking signal generator configured to define a leading-edge blanking time at the beginning of the turned-on time; the clamp circuit configured to set the filtered signal to a start value within the leading-edge blanking time.

4. The power controller as claimed in claim 3, wherein the PWM signal generator is configured to determine the turned-on time according to the current sense signal, and the turned-on time is at least the leading-edge blanking time.

5. The power controller as claimed in claim 3, wherein the state detection circuit comprises:
a comparator configured to compare the filtered signal with a predetermined voltage to generate a risk signal.

6. The power controller as claimed in claim 5, wherein the starting value of the filtered signal is less than the predetermined voltage so that the risk signal is at a first level within the leading-edge blanking time.

7. The power controller as claimed in claim 6, wherein the state detection circuit is configured to check the risk signal at a predetermined time point after the leading-edge blanking time to determine whether to generate the short-circuited protection signal.

8. The power controller as claimed in claim 7, wherein at the predetermined time point, when the filtered signal is greater than the predetermined voltage, the risk signal is not the first level, and the state detection circuit does not generate the short-circuited protection signal; when the filtered signal is less than the predetermined voltage, the risk signal is the first level, and the state detection circuit generates the short-circuited protection signal.

9. A control method applied to a power controller to control a power switch, the power switch, a current sense resistor, and an inductive component connected between two power lines in series, the current sense resistor configured to provide a current sense signal, the control method comprising steps of:
alternatively turning on and turning off the power switch to generate a plurality of switch cycles having a first switch cycle, the first switch cycle having a turned-on time and a turned-off time,
filtering the current sense signal in a high-pass manner within the turned-on time to generate a filtered signal, and
providing a short-circuited protection signal to prevent the power switch being turned on when the filtered signal is less than a predetermined voltage within the turned-on time.

10. The control method as claimed in claim 9, further comprising steps of:
defining a leading-edge blanking time at the beginning of the turned-on time, the turned-on time at least equal to the leading-edge blanking time, and
setting the filtered signal to a start value within the leading-edge blanking time.

11. The control method as claimed in claim 10, further comprising steps of:
comparing the filtered signal and a predetermined voltage to generate a risk signal, and
checking the risk signal at a predetermined time point after the leading-edge blanking time to determine whether to generate the short-circuited protection signal.

12. The control method as claimed in claim 11, further comprising steps of:
making the risk signal be a first level when the start value set in the leading-edge blanking time is less than the predetermined voltage,
making the risk signal different from the first level when the filtered signal is greater than the predetermined voltage at the predetermined time point, so that the short-circuited protection signal is not generated, and
making the risk signal be still the first level when the filtered signal is less than the predetermined voltage at the predetermined time point, so that the short-circuited protection signal is generated.

13. A power controller configured to control a power switch, the power switch, a current sense resistor, and an inductive component connected between two power lines in series, the current sense resistor configured to provide a current sense signal, the power controller comprising:
a PWM signal generator configured to generate a PWM signal to the power switch to generate a plurality of switch cycles having a first switch cycle, and the first switch cycle having a turned-on time and a turned-off time, and
a short-circuited protection circuit configured to receive the current sense signal, the short-circuited protection circuit comprising:
a high-pass filter configured to filter the current sense signal in a high-pass manner to generate a filtered signal, and
a state detection circuit configured to detect the filtered signal,
wherein when the filtered signal meets a predetermined condition that the current sense resistor is short-circuited within the turned-on time, the state detection circuit provides a short-circuited protection signal to disable the PWM signal generator to prevent the power switch being turned on.

14. The power controller as claimed in claim 13, wherein the short-circuited protection circuit further comprises:
a clamp circuit configured to set the filtered signal to a starting value at the beginning of the turned-on time.

15. The power controller as claimed in claim 14, wherein the PWM signal generator comprises:
a leading-edge blanking signal generator configured to define a leading-edge blanking time at the beginning of the turned-on time; the clamp circuit configured to set the filtered signal to a start value within the leading-edge blanking time.

16. The power controller as claimed in claim 14, wherein the state detection circuit comprises:
a comparator configured to compare the filtered signal with a predetermined voltage to generate a risk signal; the starting value of the filtered signal is less than the predetermined voltage so that the risk signal is at a first level within the leading-edge blanking time.

17. The power controller as claimed in claim 16, wherein the state detection circuit is configured to check the risk signal at a predetermined time point after the leading-edge blanking time to determine whether to generate the short-circuited protection signal.

* * * * *